(12) United States Patent
Boa

(10) Patent No.: US 8,332,167 B2
(45) Date of Patent: Dec. 11, 2012

(54) DIGITAL MULTI RANGE LIQUID LEVEL DETECTOR

(75) Inventor: Steve Boa, Montreal (CA)

(73) Assignee: Fusion RDI Industries Inc., Montreal, Quebec (CA)

( * ) Notice: Subject to any disclaimer, the term of this patent is extended or adjusted under 35 U.S.C. 154(b) by 264 days.

(21) Appl. No.: 12/775,451

(22) Filed: May 6, 2010

(65) Prior Publication Data

US 2010/0286933 A1 Nov. 11, 2010

Related U.S. Application Data

(60) Provisional application No. 61/176,215, filed on May 7, 2009.

(51) Int. Cl.
*G01F 23/26* (2006.01)
(52) U.S. Cl. .............................. 702/55; 702/47; 702/52
(58) Field of Classification Search .................... 702/45, 702/47, 50, 51, 52, 55; 73/1.01, 1.31, 1.73, 73/1.83
See application file for complete search history.

(56) References Cited

U.S. PATENT DOCUMENTS 4,819,483 A * 4/1989 Emplit et al. ............... 73/304 C

* cited by examiner

*Primary Examiner* — Sujoy Kundu
(74) *Attorney, Agent, or Firm* — Panitch Schwarze Belisario & Nadel LLP

(57) ABSTRACT

A digital multi range liquid level detector to verify and maintain a predetermined level in a container. The level is measured by a capacitive sensor located above or in the liquid to be maintained. The capacitive sensor is composed of a pair of probe connected to a signal converter chip to obtain a digital data. The digital data is then compared to a reference value obtain during the initial calibration. The present invention is composed of two paired components, a capacitive digital sensor and a fluid control valve that can be installed at different locations. The sensor determines the liquid level and then transmits the acquired data to the fluid valve control receiver via wire or radio frequency (RF). The sensor and valve are programmable in order to evaluate different possibilities such as water level, water activities and recurring low level demands. They can also be reprogrammed.

13 Claims, 10 Drawing Sheets

DIGITAL MULTI RANGE LIQUID LEVEL DETECTOR

CROSS-REFERENCE TO RELATED APPLICATIONS

The present application claims the priority of U.S. provisional patent application No. 61/176,215 filed on May 7, 2009.

BACKGROUND

1. Field of the Invention

The present invention relates to the field of detecting devices. More particularly, this invention relates to a digital multi range liquid level detector to verify and maintain a predetermined level of liquid in a container.

2. Prior Art

Liquid level detection is important in many applications. For instance, in a swimming pool, water level can vary significantly due to swimmer activities, water leak in accessories such as solar heater and evaporation. These problems can cause damage to the pump and sidewall of the pool. Several inventors have tried to solve these problems by adding mechanical floating valves or floats combined with electric solenoid but all these inventions involve a mechanical floating device.

For example, U.S. Pat. No. 10,415,526 shows a liquid level controller including a radio frequency transmitter and receiver. The transmitter determines the water level using a floating magnet which closes a magnetic switch in lower and upper position. The movable floating magnet is installed in a perforated hollow cylinder. The floating magnet can get stuck in the hollow cylinder and cause failures.

U.S. Pat. No. 10,823,184 shows a similar device except that they use an immersed probe. U.S. Pat. No. 10,394,947 shows a capacitive sensor that's use a reference electrode and a capacitive electrode of larger area. While such a system is workable, improvements are desirable.

SUMMARY OF THE INVENTION

The present invention provides an efficient way to determine and maintain the level of liquid in a container with or without the need of a physical contact with liquid. The level is measured by a capacitive sensor located above or in the liquid to be maintained. The capacitive sensor is composed of a pair of probes connected to a signal converter IC chip to obtain digital data. The digital data is then compared to a reference value obtain during the initial calibration. The present invention is composed of two paired components, a capacitive digital sensor and a fluid control valve that can be installed at different locations. The sensor determines the liquid level and then transmits the acquired data to the valve control receiver via wire or radio frequency (RF) module. The radio frequency module option uses a predetermined unique high security code which eliminates any danger of interference from an outside signal source. The data is processed through a program implemented in the valve and sensor microprocessors.

The foregoing and other objects, features, and advantages of this invention will become more readily apparent from the following detailed description of a preferred embodiment with reference to the accompanying drawings, wherein the preferred embodiment of the invention is shown and described, by way of examples. As will be realized, the invention is capable of other and different embodiments, and its several details are capable of modifications in various obvious respects, all without departing from the invention. Accordingly, the drawings and descriptions are to be regarded as illustrative in nature, and not as restrictive.

BRIEF DESCRIPTION OF THE PREFERRED EMBODIMENT

Figure 1:
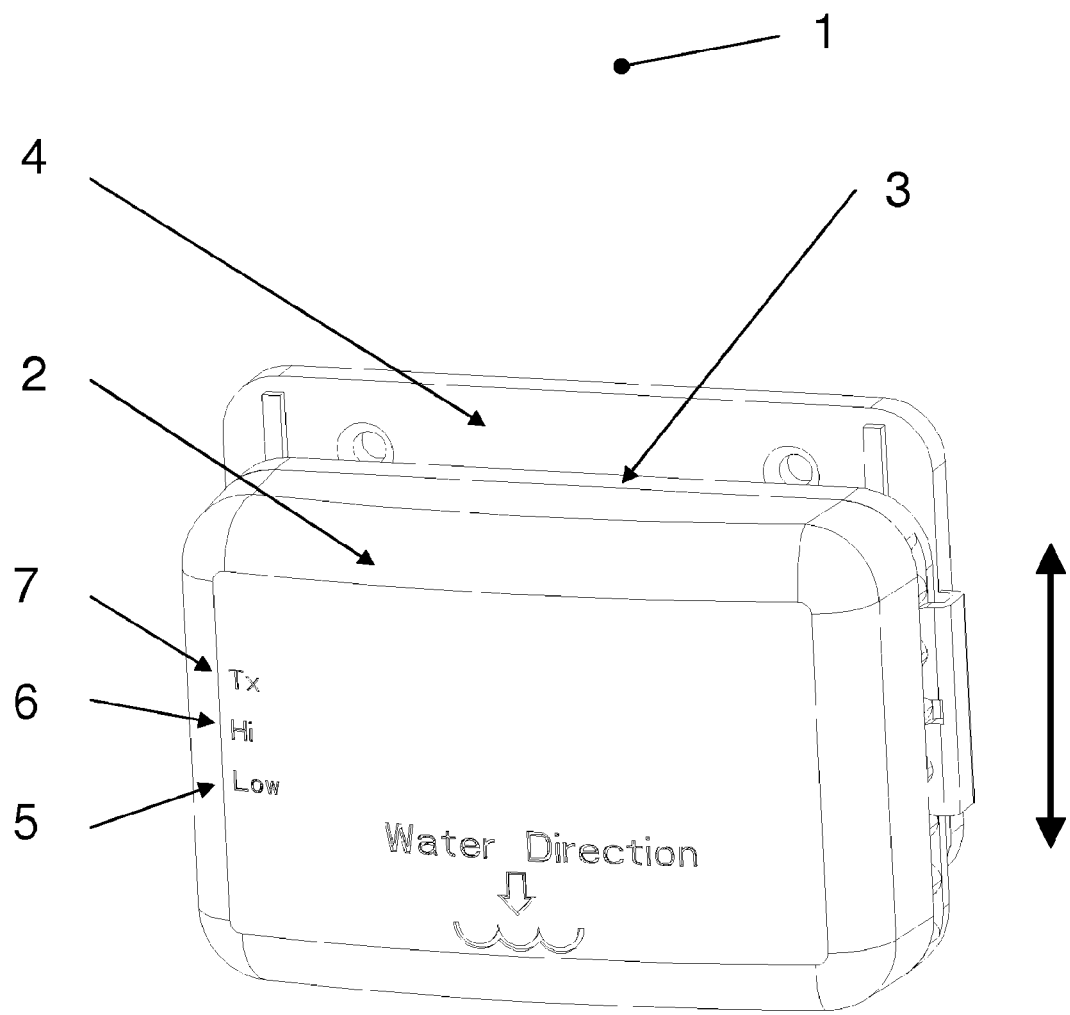
FIG. 1 is a front perspective view of the digital multi range liquid level sensor detector mounted on adjustable height bracket in accordance with a preferred embodiment of the system of the present invention.
Figure 3:
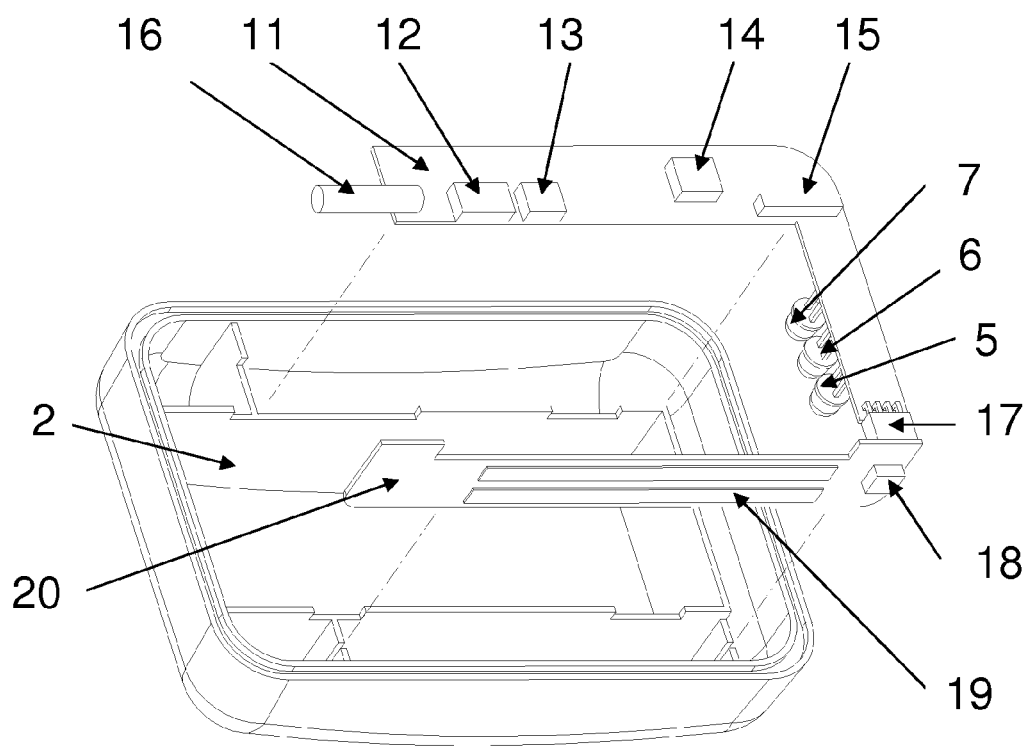
Figure 4:
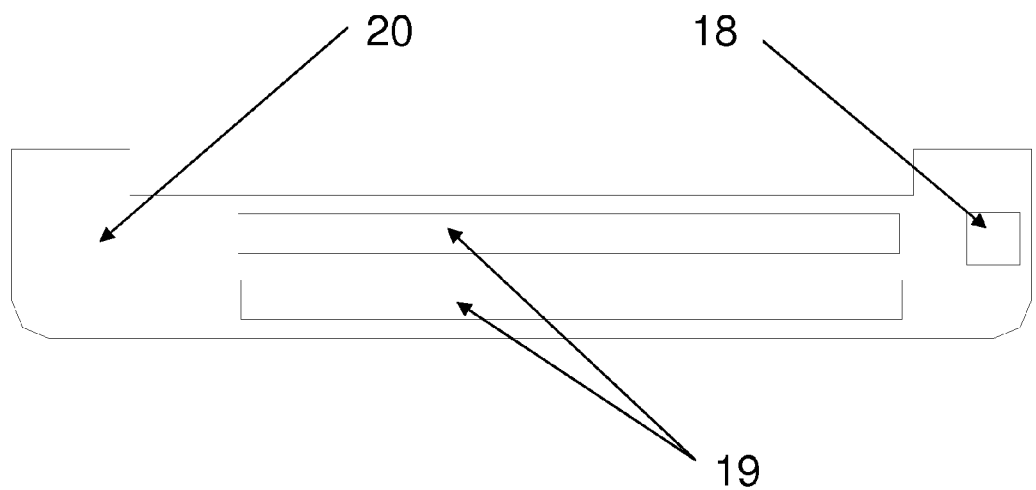
Figure 5:
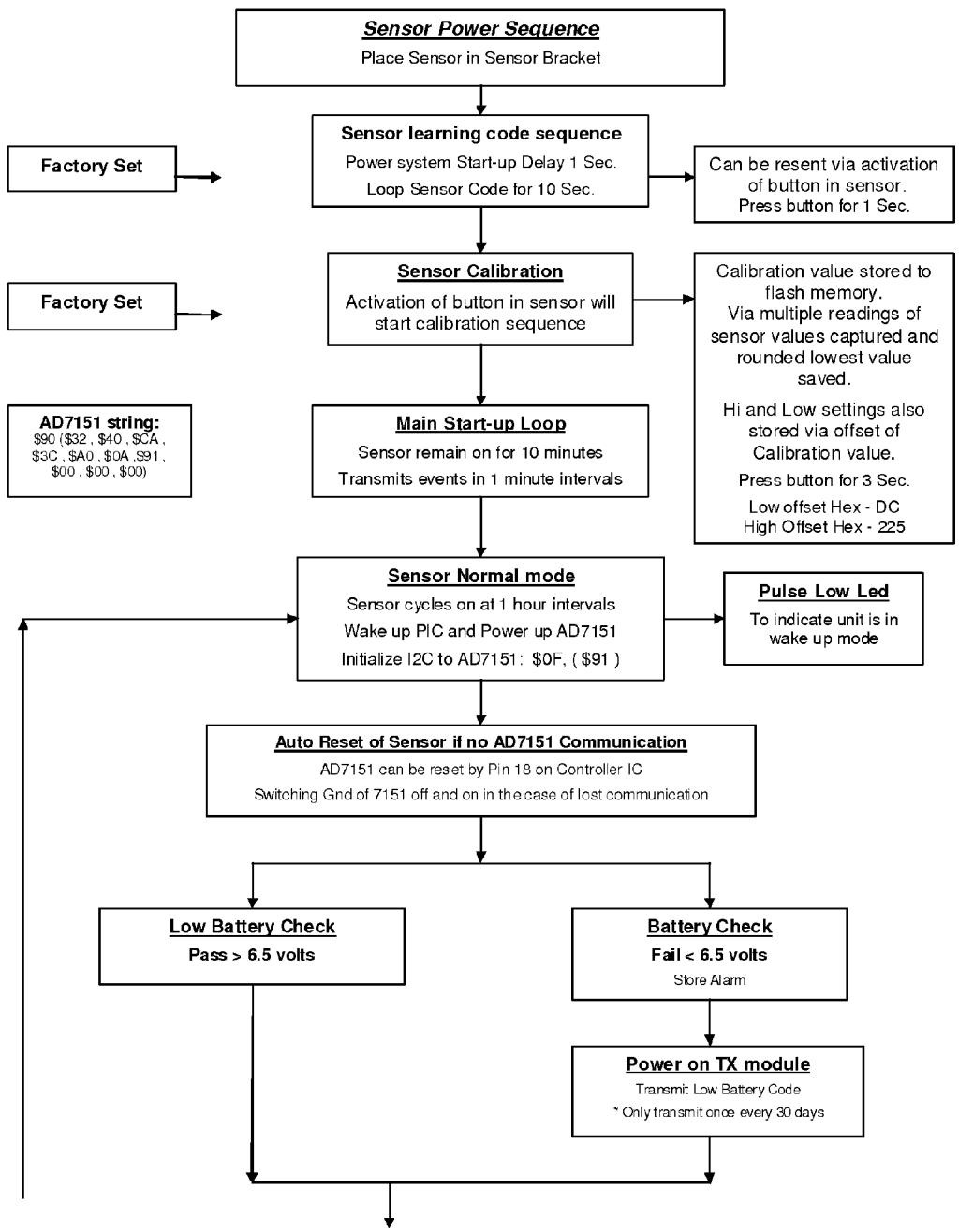
Figure 6:
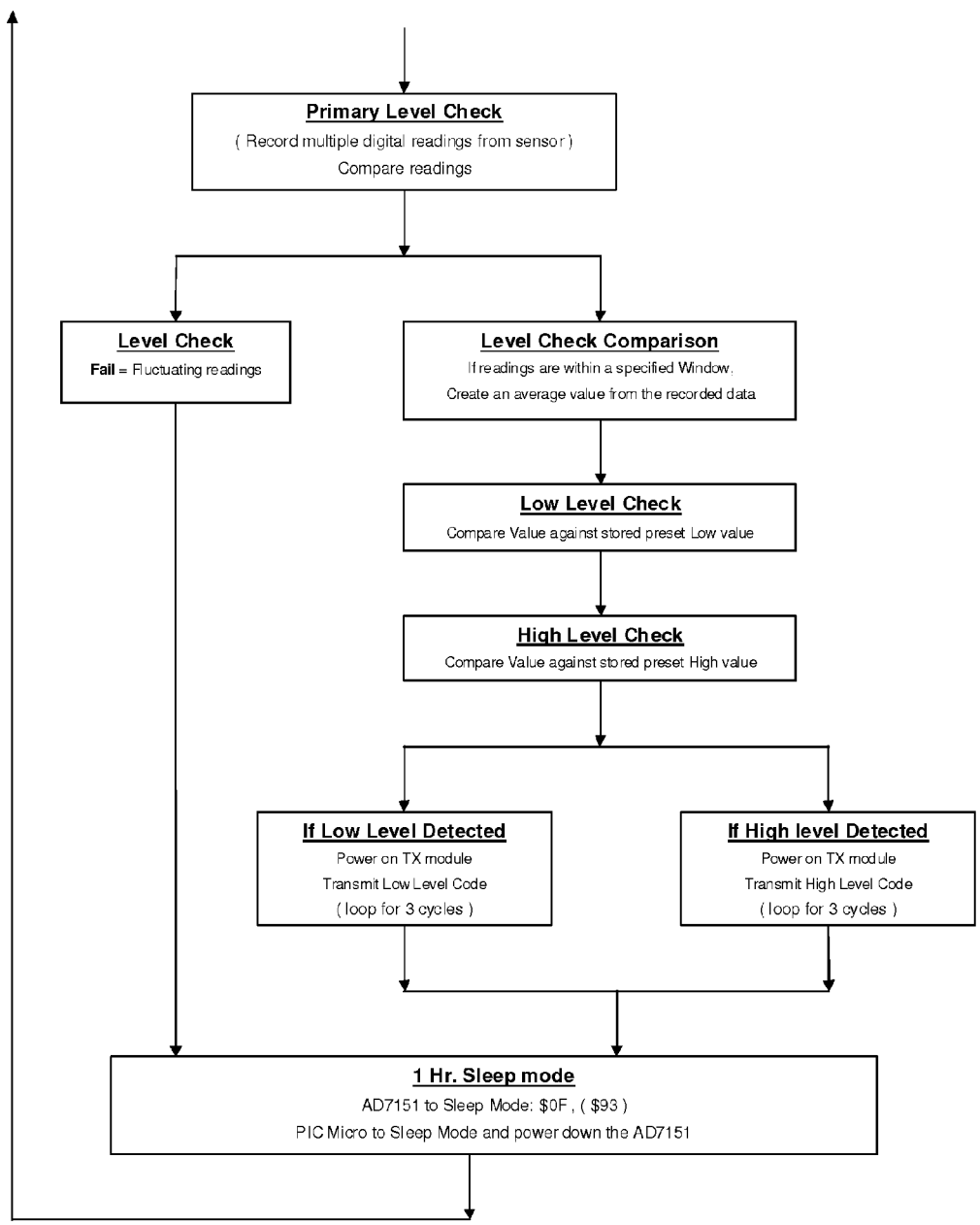
Figure 7:
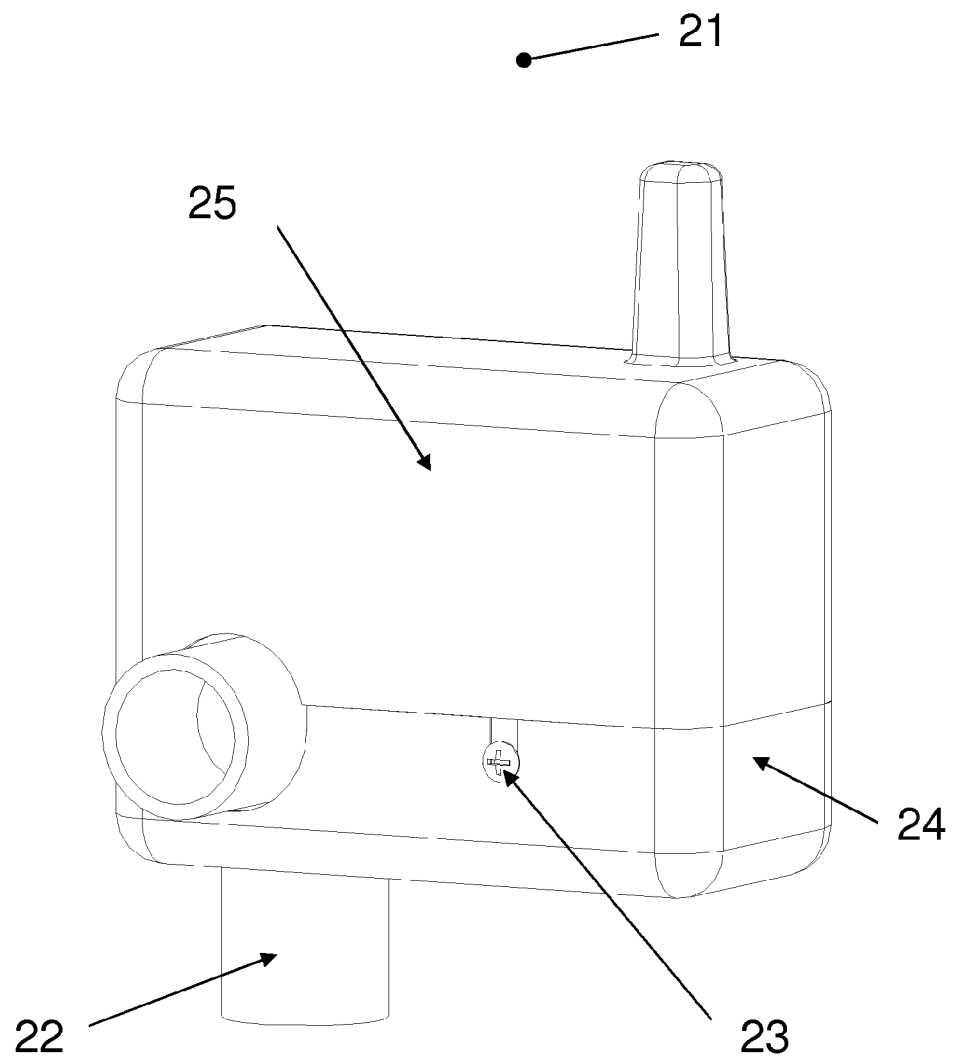
Figure 8:
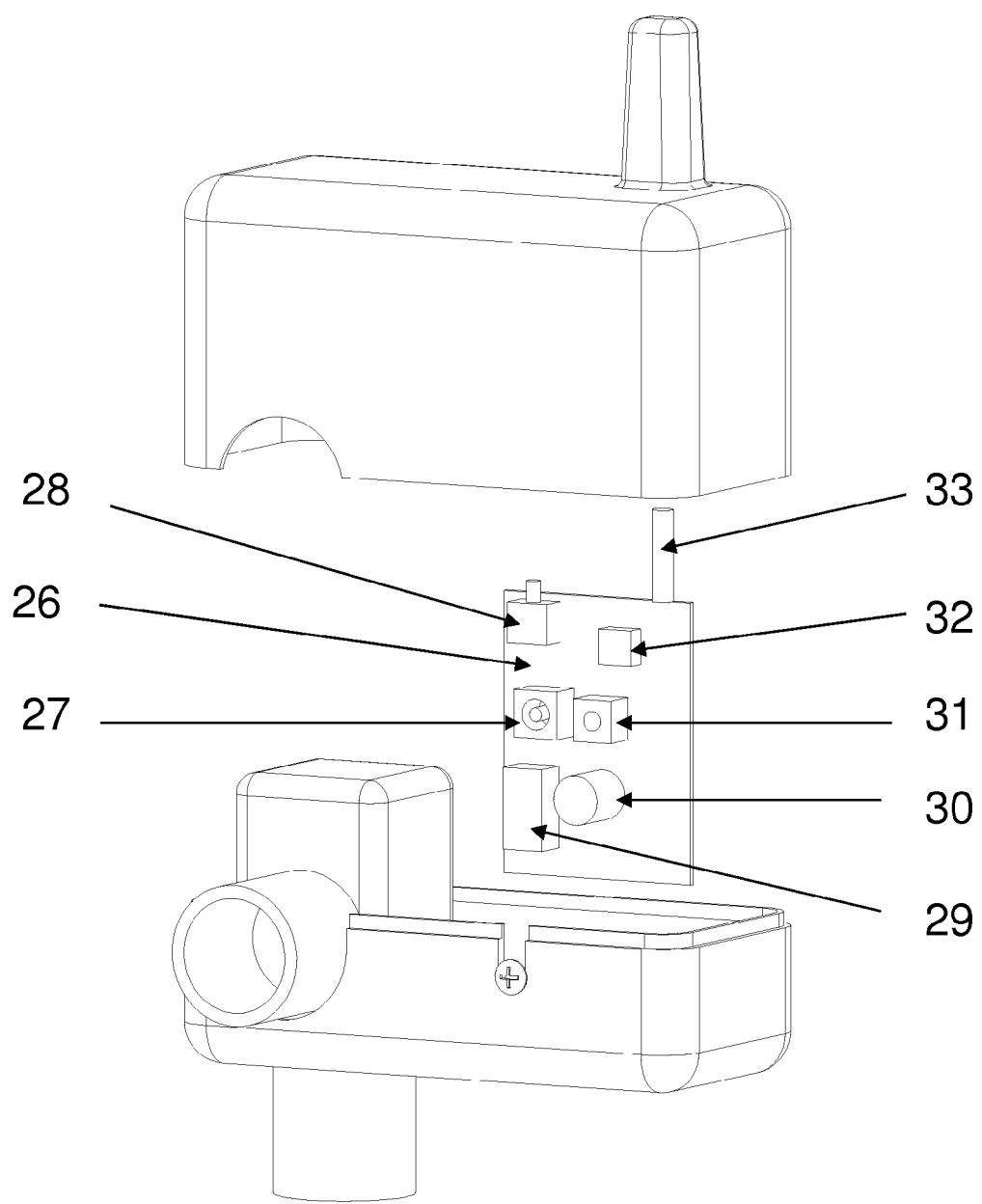
Figure 9:
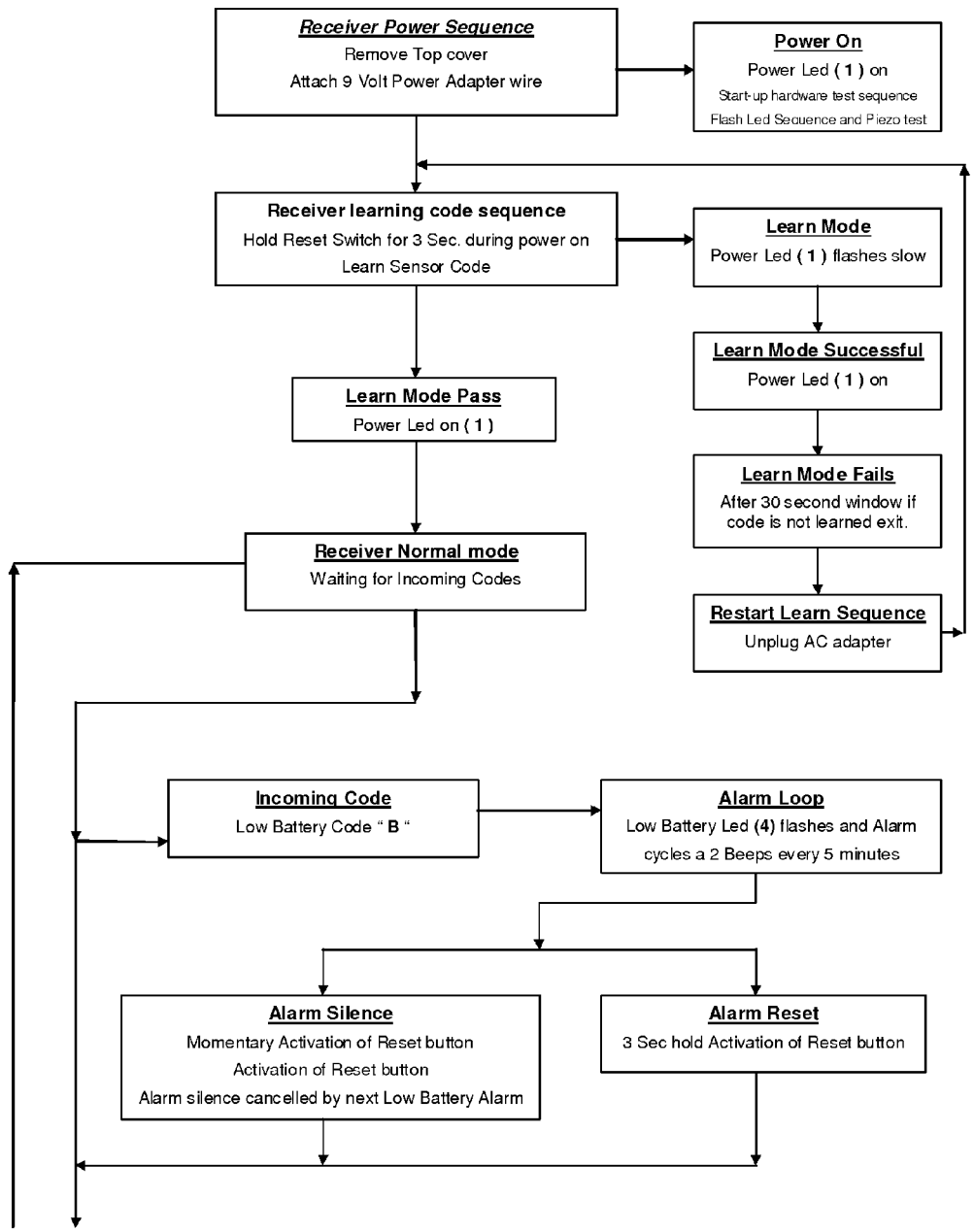
Figure 10:
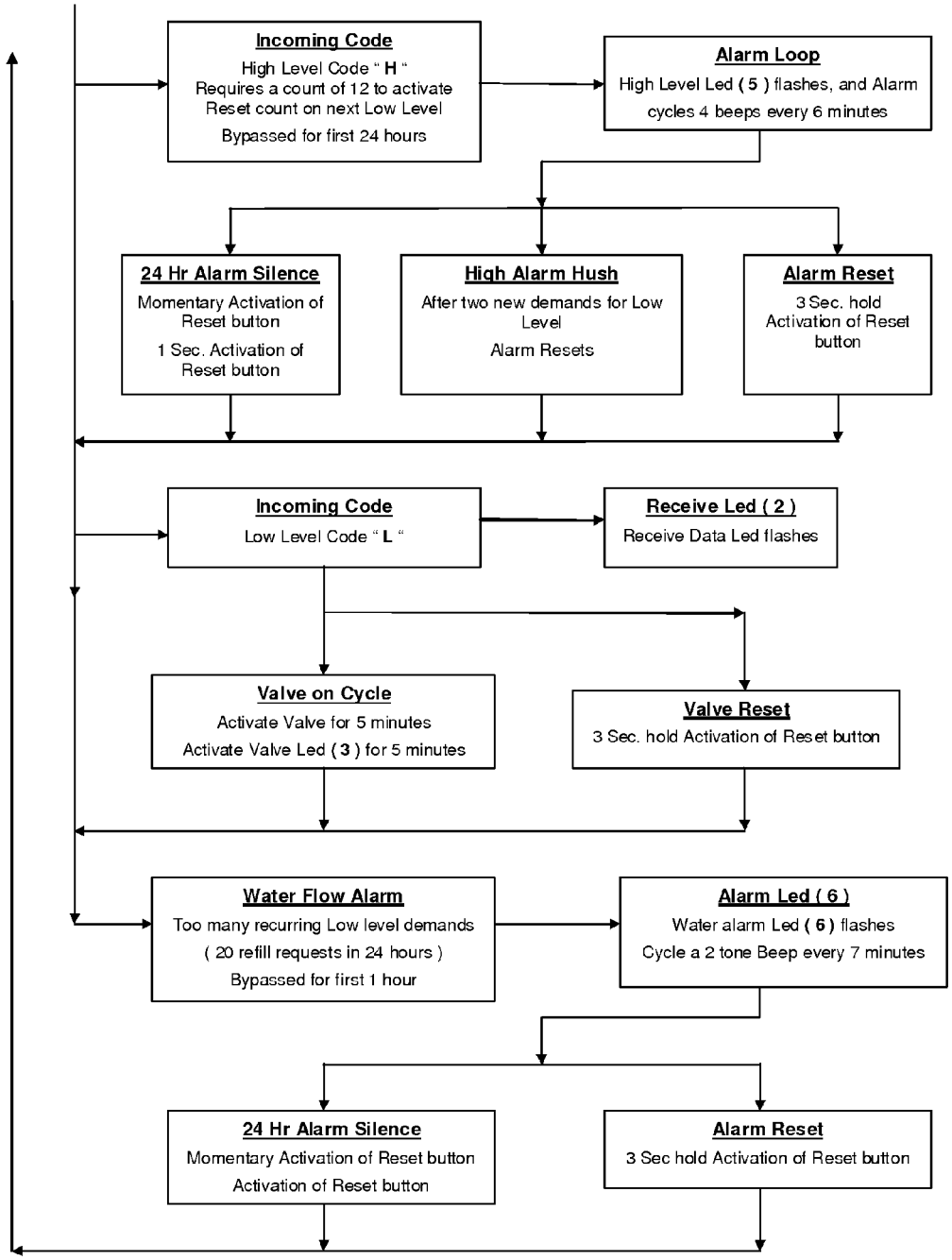

FIG. 3 a partially exploded rear perspective view of the interior of the digital multi range liquid level sensor detector of FIG. 1;

FIG. 4 a bottom plan view of a capacitive sensor of the digital multi range liquid level sensor detector of FIG. 1;

FIGS. 5 and 6 show a block diagram of the operational features of the transmitter sensor unit for controlling the digital multi range liquid level sensor detector of FIG. 1 with the block diagram extending across both FIGS. 5 and 6;

FIG. 7 is a front perspective view of the fluid control valve in accordance with the preferred embodiment of the system of the present invention;

FIG. 8 is a front perspective, partially exploded view of the fluid control valve of FIG. 7; and FIGS. 9 and 10 show a block diagram of the operational features of the fluid control valve receiver unit of FIG. 7 with the block diagram extending across both FIGS. 9 and 10.

DETAILED DESCRIPTION OF THE PREFERRED EMBODIMENT

FIG. 1 A digital multi range liquid level detector (1) as illustrated is composed of a sensor housing (2) that is permanently assembled to a cover (3) that is mounted in order to permit a vertical adjustment with the sensor bracket (4). The front of the sensor housing (2) is translucent in order to see low level LED (5), high level LED (6) and transmitting LED (7).

Figure 2:
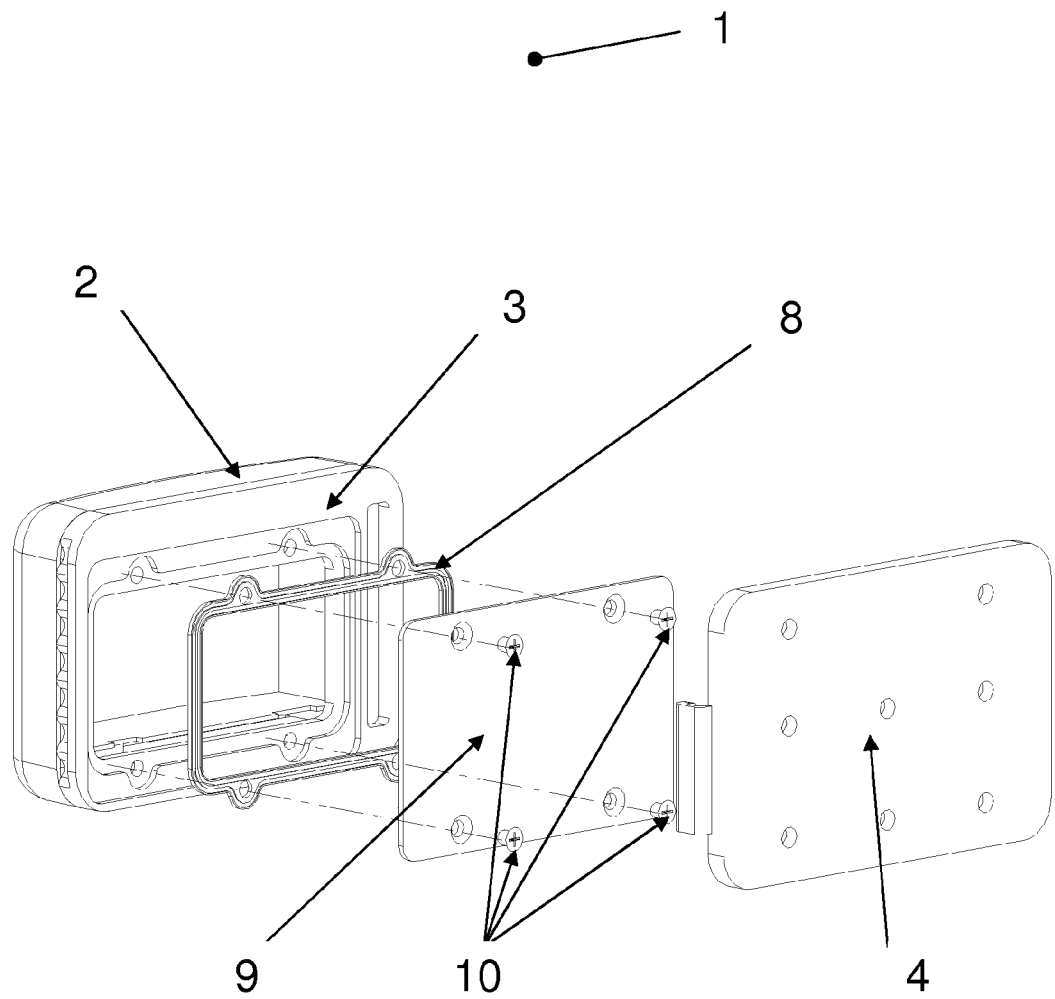
FIG. 2 is a partially exploded rear perspective view of the digital multi range liquid level sensor detector of FIG. 1.

FIG. 2 The sensor housing (2) and the cover (3) contain electronic components and a battery (not shown) in a waterproof removable cover (9) that is sealed with a gasket (8) assembled with screw (10).

FIG. 3-4-5-6 The sensor housing (2) contains printed circuit board (11) on which is mounted a program connector (12) that permits the communication with microprocessor IC (14). The microprocessor IC (14) is implemented with a program that is represented in the block diagram of the FIG. 5-6. The activation of the button (13) can activate the learning code sequence or start calibration depending of press delay shown in block diagram of the FIG. 5-6. The reed switch (15) is used to save energy when sensor bracket (4) is not assembled with the cover (3). The antenna (16) is used with the transmitter module (not shown) but not installed when the sensor is wire mounted. The sensor printed circuit board (20) is composed of capacitive electrodes (19) that are mounted parallel to the detected liquid. The capacitance converter AD7151 (18) communicates with microprocessor IC (14) via electrical connector (17).

FIG. 7-8 The fluid control valve (21) as illustrated is composed of solenoid valve (22), a housing (24), a cover (25), a screw (23) and a printed circuit board (26). The printed circuit board (26) is composed of a relay (29) to activate the solenoid valve (22), a beeper (30) for the alarm, a power connector (27), a reset button (28) a port (31) for either sensor cable or antenna (33) for optional radio frequency data transmission via module receiver (not shown).

The invention claimed is:

1. A digital multi range liquid level detector control system to determine and maintain the level of liquid in a swimming pool having a liquid surface with or without the need of a physical contact with liquid, the system comprising:
   a fluid control valve including a solenoid valve; and
   a capacitive digital sensor detector comprised of a capacitive electrode with a capacitive converter IC chip that obtains digital data coupled with a logic printed circuit board for data processing and transmitting, a sensor housing enclosing the capacitive electrode, the capacitive converter IC chip and the logic printed circuit board, the capacitive electrode comprised of at least two capacitive electrodes that are spaced apart in parallel and oriented planar to the liquid surface, said fluid control valve being in communication with the logic printed circuit board of the capacitive digital sensor detector for receiving and processing acquired data from the capacitive electrode of the capacitive digital sensor detector related to the position of the liquid surface relative to the capacitive digital sensor detector, the capacitive digital sensor detector comparing the acquired data to a stored preset low value and a stored preset high value.

2. The system of claim 1 wherein said capacitive converter IC chip converts a capacitive signal in order to create a range of detection signals.

3. The system of claim 1 wherein said capacitive converter IC chip is coupled to said logic printed circuit board to determine if the acquired data is within a predetermined range of detection signal.

4. The system of claim 3 wherein said logic printed circuit board of the capacitive digital sensor transmits data to a receiver of the fluid control valve utilizing the valve antenna and the sensor antenna if acquired data is not within the predetermined range.

5. The system of claim 1, wherein the fluid control valve and the capacitive digital sensor detector are programmable in order to process data within a predetermined range and evaluate different possibilities such as water level, water activities and recurring low level demands.

6. The system of claim 5, wherein the fluid control valve and the capacitive digital sensor detector are reprogrammable.

7. The system of claim 1 wherein the fluid control valve further includes a beeper and a valve antenna and the capacitive digital sensor detector further includes a sensor antenna.

8. The system of claim 7 wherein the fluid control valve is in communication with the capacitive digital sensor detector via radio frequency transmission between the valve antenna and the sensor antenna.

9. The system of claim 1 further comprising:
   a sensor bracket for mounting the sensor housing to the swimming pool, the sensor bracket permitting a vertical adjustment of the sensor housing relative to the sensor bracket.

10. The system of claim 1 wherein the capacitive digital sensor detector further includes a cover permanently assembled to the sensor housing, the sensor housing and the cover contain electronic components and a battery in a waterproof removable cover that is sealed with a gasket assembled to the cover with screws.

11. The system of claim 1 wherein the capacitive digital sensor detector transmits a low level code to the fluid control valve if the acquired data is less than the stored preset low value, thereby causing the solenoid valve to open.

12. The system of claim 1 wherein the capacitive digital sensor detector transmits a high level code to the fluid control valve if the acquired data is greater than the stored preset high value, thereby causing initiation of an alarm loop.

13. The system of claim 12 wherein the alarm loop includes flashing of a light-emitting diode (LED) on the capacitive digital sensor detector and sounding an audible alarm from a beeper of the fluid control valve.

\* \* \* \* \*